United States Patent
Tang et al.

[19]

[11] Patent Number: 5,887,265
[45] Date of Patent: Mar. 23, 1999

[54] CHANNEL SELECTION FOR RADIO COMMUNICATION SUPPORTABLE WITH REPEATERS

[75] Inventors: Ting Fook Tang, Taman Sri Nibong; Wing Wong Thum; Chian Ming Tan, Georgetown, all of Malaysia

[73] Assignee: Motorola, Inc., Schaumburg, Ill.

[21] Appl. No.: 782,376

[22] Filed: Jan. 13, 1997

[51] Int. Cl.[6] ........................................ H04B 7/26
[52] U.S. Cl. ........................ 455/509; 455/513; 455/514
[58] Field of Search ................... 455/509, 510, 455/512, 513, 514, 517, 518, 519, 525, 524, 450, 452; 370/312, 315, 327, 329

[56] References Cited

U.S. PATENT DOCUMENTS 5,396,648  3/1995  Petsiokas et al. ...................... 455/509
5,423,055  6/1995  Diaz et al. ............................... 455/519

*Primary Examiner*—Thanh Cong Le
*Attorney, Agent, or Firm*—Andrew S. Fuller

[57] ABSTRACT

A radio (1) for radio communication supportable with repeaters. The radio (1) has a transceiver (2) for receiving information on either a repeater channel or a talkaround channel. A monitor (3) is coupled to the transceiver (2) to provide output signals indicative of channel strengths of the two channels. The output signals are compared by a controller (4) to provide a selected channel from the two channels. Information is then received by radio (1) on the selected channel. When receiving the information, the controller (4) periodically controls the transceiver (2) to receive on an unselected channel of the two channels. The monitor (3) then provides a new output signal corresponding to the unselected channel for the controller (4) to re-compare and re-select the selected channel.

12 Claims, 2 Drawing Sheets

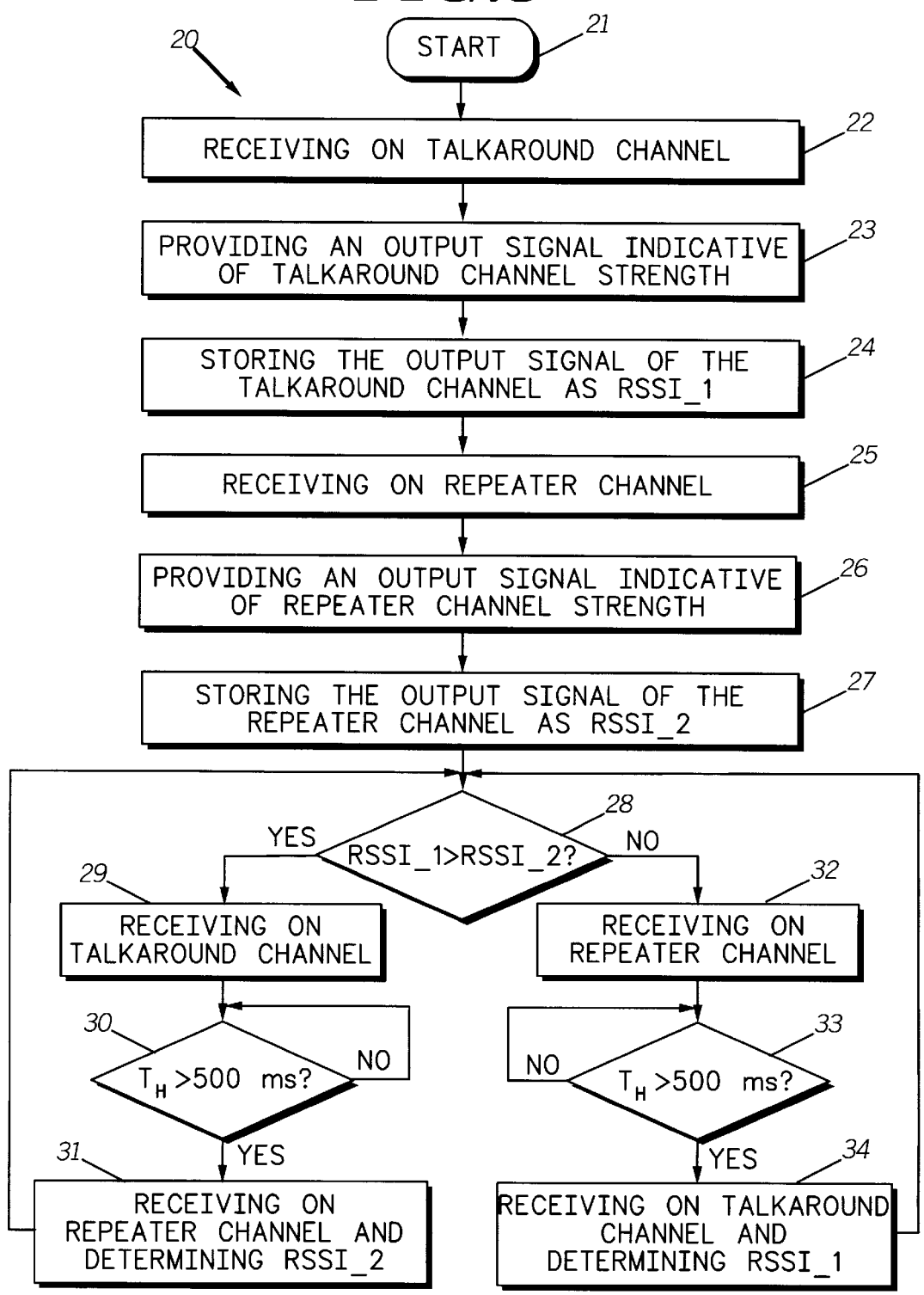

CHANNEL SELECTION FOR RADIO COMMUNICATION SUPPORTABLE WITH REPEATERS

FIELD OF THE INVENTION

This invention relates to channel selection for radio communication supportable with repeaters. In particular, this invention relates to, but is not necessarily limited by, a method and a radio for automatically selecting channels for radio communication based on channel strength.

BACKGROUND OF THE INVENTION

Radio communication provides for information to be modulated onto channels corresponding to carrier frequencies of the radio frequency band. Such information is then transmitted and received on the channels by radios that are within communication range of each other. This communication range can be extended by using what is commonly known as repeaters to receive and re-transmit the information to other radios. When radios communicate via a repeater, a transmitting radio transmits information on a channel to the repeater. The repeater receives this information and then re-transmits the information to other radios on a different channel.

A repeater cannot be use when radios are not within communication range of the repeater or when channels used by the repeater are not available for relaying information by receiving and re-transmitting. When the repeater cannot be used for relaying information, direct communication between radios may still be possible. However, such radios need to be within communication range of each other. Direct communication without using repeaters is known in the art as talkaround.

In U.S. Pat. No. 5,423,055, a radio system is described in which multiple talkarounds are controlled by a system controller based on geographical distances between radios. In the multiple talkarounds described in U.S. Pat. No. 5,423,055, users need to manually activate a switch on a radio to enable the radio to communicate directly with other radios using one or more talkaround channels. This can be a problem as the users will then have to determine when talkaround channels are required and may forget to switch back to using repeater channels after talkaround. Incorrectly determining use of the talkaround channels or forgetting to switch to using the repeater channels after talkaround typically cause communication failure. Furthermore, conventional radio systems require use of system resources for determining possibility of talkaround before enabling radios to do so. Such determining puts additional demands on the system resources which can otherwise be used elsewhere in a radio system.

Therefore, it is desirable to overcome or at least alleviate at least one of the problems associated with channel selection for radio communication systems supportable with repeaters.

BRIEF DESCRIPTION OF THE DRAWINGS

FIG. 3 is a detailed flow diagram showing operation of the radio of FIG. 1.

DETAILED DESCRIPTION OF THE INVENTION

Figure 1:
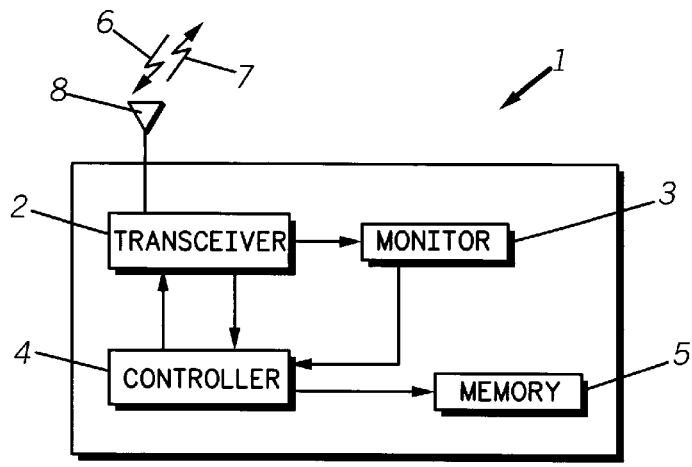
FIG. 1 shows a block diagram of a radio in accordance with a preferred embodiment of the invention.

FIG. 1 shows a block diagram of a radio 1 in accordance with a preferred embodiment of the invention. Radio 1 comprises a transceiver 2 connectable to an antenna 8 and coupled to a monitor 3. Radio 1 also comprises a controller 4 associated with a memory 5 and coupled to transceiver 2 and monitor 3.

In use, controller 4 controls transceiver 2 to receive and transmit information signals 6, 7 via antenna 8. Information is received by transceiver 2 from another radio on at least two predetermined channels including at least one talkaround channel and at least one repeater channel. The channels are monitored by monitor 3 after power up of radio 1 by controlling transceiver 2 to receive on the channels. Output signals indicative of channel strengths of the channels are provided by monitor 3 when transceiver 2 is receiving information or, in the absence of information, channel noise. The output signals are stored within memory 5. Controller 4 compares the output signals to select one of the channels as a selected channel. The selected channel has an output signal indicative of a maximum or stronger channel strength as determined from the output signals provided by monitor 3. Controller 4 also periodically controls transceiver 2 to receive on unselected channel(s) and thereby receive new output signal(s) corresponding to these unselected channel(s). The new output signal(s) replaces the output signals previously stored in memory 5 and are used by controller 4 to re-compare with the output signal of the selected channel and re-select one of the channels.

Radio 1 advantageously selects a channel to receive information independent of system resources. In contrast to prior art radio communication, channel selection by radio 1 is simple and does not involve use of system resources to determine, for example, whether talkaround is possible. A further advantage of radio 1 is that channel selection is also independent of user activation. Hence, problems resulting from users incorrectly determining talkaround or forgetting to manually switch transceiver 2 back to using repeater channels after talkaround are alleviated.

Figure 2:
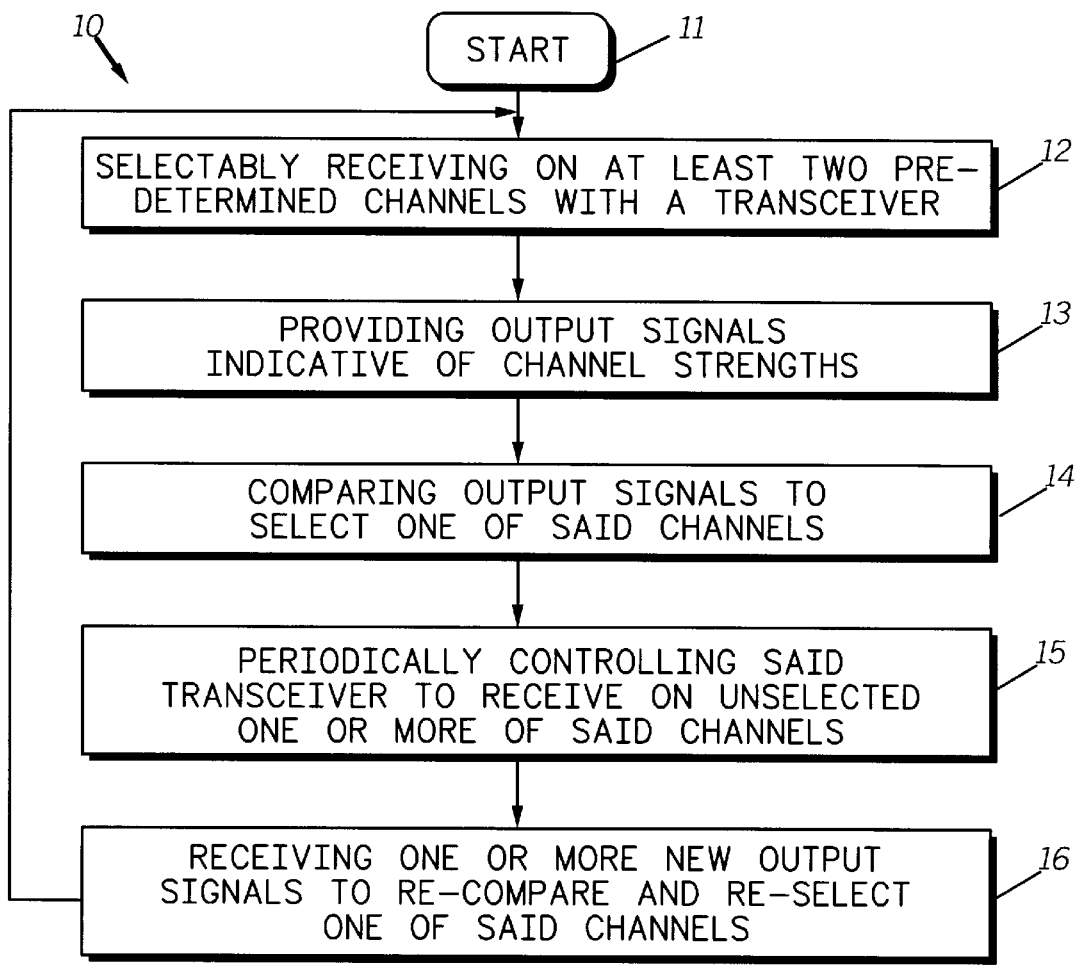
FIG. 2 is a flow diagram illustrating how the radio of FIG. 1 selects a predetermined channel.

FIG. 2 is a flow diagram 10 illustrating how radio 1 selects a predetermined channel. After starting at step 11, controller 4 controls transceiver 2 to selectably receive on at least two predetermined channels at step 12. The channels include at least one talkaround channel and at least one repeater channel. In this step of selectably receiving, controller 4 controls transceiver 2 to switch to the channels sequentially so that channel strength of each of the channel can be monitored by monitor 3. At step 13, monitor 3 provides output signals indicative of channel strengths of the channels when transceiver 2 is receiving information or, in the absence of information, channel noise. The output signals are stored in memory 5. Comparing the output signals at step 14, controller 4 selects one of the channels as a selected channel for the transceiver 2 to receive information. The selected channel has an output signal indicative of a maximum channel strength as determined from the output signals provided by step 13. At step 15, which can occur when radio 1 is receiving information on the selected channel, controller 4 periodically controls transceiver 2 to receive on an unselected one or more of the channels. Controller 4 periodically controls transceiver 2 after lapse of a time period. The time period is variable and can be programmable or user selectable. Thereafter, in step 16, controller 4 receives one or more new output signals corresponding to the unselected one or more of the channels received at step 15. The new output signals are received by controller 4 to re-compare with the output signal of the selected channel and re-select one of the channels for transceiver 2 to receive information. At step 16, new output signals indicative of channel strengths of the unselected one or more of said channels are provided by monitor 3 for re-comparing by controller 4 to re-select one of the channels.

FIG. 3 is a detailed flow diagram 20 showing operation of radio 1. In this flow diagram 20, two predetermined channels are available for transceiver 2 to receive information from a transmitting radio. These two channels are a talkaround channel and a repeater channel. The talkaround channel is used by the transmitting radio to transmit the information and the repeater channel is used by a repeater to re-transmit the information upon receiving the information on the talkaround channel from the transmitting radio.

Upon starting at step 21, controller 4 controls transceiver 2 at the step of receiving 22 by, for example, programming a synthesizer of transceiver 2 to receive on the talkaround channel. At step 23, monitor 3 provides an output signal indicative of the talkaround channel strength from monitoring the talkaround channel when the synthesizer is locked and stabilized. As the output signal indicative of the talkaround channel strength is in an analog format, controller 4 digitizes and stores this output signal in a digital format as RSSI_1 in memory 5 at step 24.

Next, controller 4 controls transceiver 2 at the step of receiving 25 by programming the synthesizer to receive on the repeater channel. At step 26, monitor 3 provides an output signal indicative of the repeater channel strength from monitoring the repeater channel when the synthesizer is locked and stabilized. As the output signal indicative of the repeater channel strength is in an analog format, controller 4 digitizes and stores this output signal in a digital format as RSSI_2 in memory 5 at step 27.

Controller 4 then retrieves RSSI_1 and RSSI_2 from memory 5 for the step of comparing 28 to select either the talkaround channel or the repeater channel for receiving information. A selected channel is provided by whichever of the two channels has a stronger channel strength.

When RSSI_1 is greater than RSSI_2 at step 28 to thereby indicate that the talkaround channel has the stronger channel strength, the selected channel is then provided by the talkaround channel. Controller 4 then programs the synthesizer of transceiver 2 for receiving information on the talkaround channel at step 29. In periodically controlling transceiver 2 after step 29, controller 4 then determines whether a time period of, for example, 500 ms has lapsed at step 30. After the lapse of the 500 ms, controller 4 then controls transceiver 2 to temporarily receive on the repeater channel at step 31 so as to determine a new output signal indicative of channel strength of the repeater channel. This thereby provides a new RSSI_2 which is then stored in memory 5 and retrieved by controller 4 for re-comparing at step 28 to re-select the selected channel.

When RSSI_1 is not greater than RSSI_2 at step 28 to thereby indicate that the repeater channel has the stronger channel strength, the selected channel is then provided by the repeater channel. Controller 4 then programs the synthesizer of transceiver 2 for receiving information on the repeater channel at step 32. In periodically controlling transceiver 2 after step 32, controller 4 then determines whether a time period of 500 ms has lapsed at step 33. After the lapse of the 500 ms, controller 4 then controls transceiver 2 to temporarily receive on the talkaround channel at step 34 so as to determine a new output signal indicative of channel strength of the talkaround channel. This thereby provides a new RSSI_1 which is then stored in memory 5 and retrieved by controller 4 for re-comparing at step 28 to re-select the selected channel.

The invention as described above provides a method that advantageously differs from conventional radios in which selecting between talkaround and repeater channels are dependent on system resources. Accordingly, this invention alleviates at least one of the problems associated with channel selection for radio communication systems supportable with repeaters.

Although this invention has been described with reference to a preferred embodiment, it is to be understood that this invention is not limited to the specific embodiment described herein.

We claim:

1. A radio comprising:

a transceiver for selectably receiving on at least two predetermined channels;

a monitor coupled to said transceiver for monitoring channel strengths of said channels to provide output signals indicative of said channel strengths; and a controller coupled to said transceiver and said monitor to control said transceiver and receive said output signals, said controller being adapted to compare said output signals to select one of said channels as a selected channel, wherein when said radio is receiving on said selected channel, said controller periodically controls said transceiver to receive on an unselected one or more of said channels and thereby receive one or more new output signals to re-compare with said selected channel and re-select one of said channels.

2. The radio as in claim 1, wherein said radio further comprises a memory to store said output signals and said new output signals, said memory being associated with said controller.

3. The radio as in claim 1, wherein said controller periodically controls said transceiver to receive on said unselected one or more of said channels after lapse of a time period, said time period being variable.

4. The radio as in claim 1, wherein said controller selects or re-selects said one of said channels having a maximum or stronger channel strength of said channel strengths.

5. A method for radio communication, said method comprising the steps of:

selectably receiving on at least two predetermined channels with a transceiver;

providing output signals indicative of channel strengths of said channels;

comparing said output signals to select one of said channels as a selected channel;

periodically controlling said transceiver to receive on an unselected one or more of said channels; and receiving one or more new output signals corresponding to said unselected one or more of said channels to re-compare with said selected channel and re-select one of said channels.

6. The method as in claim 5, wherein said step of providing comprises the step of storing said output signals and said new output signals in a memory, said memory being associated with said controller.

7. The method as in claim 5, wherein said step of periodically controlling occurs after lapse of a time period, said time period being variable.

8. The method as in claim 5, wherein said step of comparing comprises the step of selecting said one of said channels having a maximum or stronger channel strength of said channel strengths.

9. A method for channel selection for radio communication supportable with repeaters, said method comprising the steps of:

selectably receiving with a transceiver on a repeater channel and a talkaround channel;

providing output signals indicative of channel strengths of said repeater channel and said talkaround channel;

comparing said output signals to select either said repeater channel or said talkaround channel as a selected channel;

periodically controlling said transceiver to receive on an unselected channel, said unselected channel being either said repeater channel or said talkaround channel; and receiving one or more new output signals corresponding to said unselected channel to re-compare with said selected channel and re-select either said repeater channel or said talkaround channel.

10. The method as in claim 9, wherein said step of providing comprises the step of storing said output signals and said new output signals in a memory, said memory being associated with said controller.

11. The method as in claim 9, wherein said step of periodically controlling occurs after lapse of a time period, said time period being variable.

12. The method as in claim 9, wherein said step of comparing:

comprises the step of selecting as said selected channel one of either said repeater channel or said talkaround channel having a stronger channel strength.

* * * * *